(12) United States Patent
Groening et al.

(10) Patent No.: US 7,362,550 B2
(45) Date of Patent: Apr. 22, 2008

(54) ELECTRIC MOTOR COMPRISING A TEMPERATURE MONITORING DEVICE

(75) Inventors: Ingolf Groening, Lohr am Main (DE); Bernd Schnurr, Lohr am Main (DE)

(73) Assignee: Rexroth Indramat GmbH, Lohr am Main (DE)

( * ) Notice: Subject to any disclaimer, the term of this patent is extended or adjusted under 35 U.S.C. 154(b) by 116 days.

(21) Appl. No.: 10/534,145

(22) PCT Filed: Oct. 24, 2003

(86) PCT No.: PCT/DE03/03545

§ 371 (c)(1),
(2), (4) Date: Dec. 5, 2005

(87) PCT Pub. No.: WO2004/045049

PCT Pub. Date: May 27, 2004

(65) Prior Publication Data

US 2006/0131968 A1 Jun. 22, 2006

(30) Foreign Application Priority Data

Nov. 13, 2002 (DE) ................. 102 52 754

(51) Int. Cl.
*H02H 1/04* (2006.01)
(52) U.S. Cl. ............... 361/27; 318/473; 374/152; 361/25
(58) Field of Classification Search ........... 318/471, 318/473; 361/24, 25, 27, 106; 417/32
See application file for complete search history.

(56) References Cited

U.S. PATENT DOCUMENTS

| | | | | |
|---|---|---|---|---|
| 3,079,524 A | * | 2/1963 | Gibson et al. | 318/473 |
| 3,366,843 A | * | 1/1968 | Evalds | 361/27 |
| 4,357,565 A | * | 11/1982 | Saito et al. | 318/473 |
| 4,683,515 A | * | 7/1987 | Beihoff et al. | 361/106 |
| 4,716,486 A | * | 12/1987 | Sobiepanek et al. | 361/24 |
| 5,123,081 A | * | 6/1992 | Bachman et al. | 388/815 |
| 6,100,660 A | * | 8/2000 | Ikeyama et al. | 318/473 |
| 6,122,153 A | * | 9/2000 | Becker | 361/25 |
| 6,142,741 A | * | 11/2000 | Nishihata et al. | 417/32 |
| 6,294,888 B1 | * | 9/2001 | Becker | 318/471 |
| 6,297,607 B1 | * | 10/2001 | Becker | 318/471 |
| 6,927,549 B2 | * | 8/2005 | Ashiya et al. | 318/471 |
| 7,064,940 B2 | * | 6/2006 | Horng et al. | 361/25 |
| 2002/0018721 A1 | * | 2/2002 | Kobayashi et al. | 417/44.1 |
| 2002/0033686 A1 | * | 3/2002 | Uhl | 318/560 |
| 2007/0019706 A1 | * | 1/2007 | Hudson | 374/152 |

FOREIGN PATENT DOCUMENTS

DE 26 35 552 2/1978
DE 31 47 905 6/1982

(Continued)

*Primary Examiner*—Lincoln Donovan
*Assistant Examiner*—Michael Brandt
(74) *Attorney, Agent, or Firm*—Michael J. Striker

(57) ABSTRACT

Disclosed is an electric motor comprising a temperature monitoring device which is provided with at least two temperature sensors that have different temperature characteristics and are connected to terminal clamps by means of electrical wires, whereby it is possible in an advantageous manner to connect regulating devices having different temperature sensor input characteristics to the electric motor.

2 Claims, 2 Drawing Sheets

FOREIGN PATENT DOCUMENTS

| | | |
|---|---|---|
| DE | 31 47 905 A1 | 6/1982 |
| DE | 1 035 328 | 9/2000 |
| DE | 199 36 218 | 2/2001 |
| DE | 199 36 218 A1 | 2/2001 |
| DE | 100 37 968 | 2/2002 |
| EP | 1 035 328 | 9/2000 |

* cited by examiner

ELECTRIC MOTOR COMPRISING A TEMPERATURE MONITORING DEVICE

CROSS-REFERENCE

The invention described and claimed hereinbelow is also described in PCT/EP 2003/003545, filed Oct. 24, 2003 and DE 102 52 754.7, filed Nov. 13, 2002. This German Patent Application, whose subject matter is incorporated here by reference, provides the basis for a claim of priority of invention under 35 U.S.C. 119 (a)-(d).

BACKGROUND OF THE INVENTION

The present invention relates to an electric motor comprising a temperature monitoring device.

With every electric motor that is supplied with power using a current converter, the operating temperature is typically monitored to protect the motor. The temperature is usually monitored using temperature sensors, the sensing elements of which are positioned in the direct vicinity of windings of the electric motor. The temperature sensors have specific temperature/resistance characteristics. Temperature sensors of this type usually have a resistance value that increases as the operating temperature increases, which corresponds to a positive temperature coefficient of the temperature sensor. Temperature monitoring and temperature tripping in the electric motor can be realized with the aid of temperature sensors. To monitor temperature, a temperature value detected by the sensor is unequivocally assigned to a certain resistance value. Temperature tripping can be thought of as a thermal switch that is tripped when a certain threshold value is reached and disconnects the electric motor from the current converter that supplies power until the temperature drops back below the threshold value.

Problems often occur in practical application due to the fact that regulating devices in electric motors are not compatible with temperature monitoring devices. In particular, purchasers of electric motors powered by current converters are often forced to select the regulating device that is compatible in terms of the temperature sensor and/or accept the fact that a temperature monitoring sensor system in the electric motor must be adapted in a complex manner to sensor characteristics of temperature sensor inputs of the regulating device using temperature sensors with different temperature characteristics.

SUMMARY OF THE INVENTION

The task on which the present invention is based, therefore, is to provide an electric motor with a temperature monitoring device that enables, in a simple and convenient manner, the connection of regulating devices having highly diverse temperature sensor input characteristics.

According to the present invention, a temperature monitoring device in an electric motor includes at least two temperature sensors with different temperature characteristics. The temperature sensors are connected to terminal clamps on the electric motor via electrical wires. It is advantageously possible to operate the electric motor with regulating devices having highly diverse temperature sensor input characteristics by way of a simple, individually selectable interconnection of temperature sensor inputs of the regulating device with the terminal clamps on the electric motor.

Advantageously, the electric motor according to the present invention includes temperature sensors with temperature monitoring characteristics and/or temperature sensors with temperature tripping characteristics. The regulating device is interconnected with the electric motor such that the signal from the temperature sensor having the desired temperature sensor characteristics is forwarded to the regulating device.

BRIEF DESCRIPTION OF THE DRAWINGS

The present invention is explained in greater detail below with reference to the attached figures.

DETAIL DESCRIPTION OF THE PREFERRED EMBODIMENTS

Figure 1:
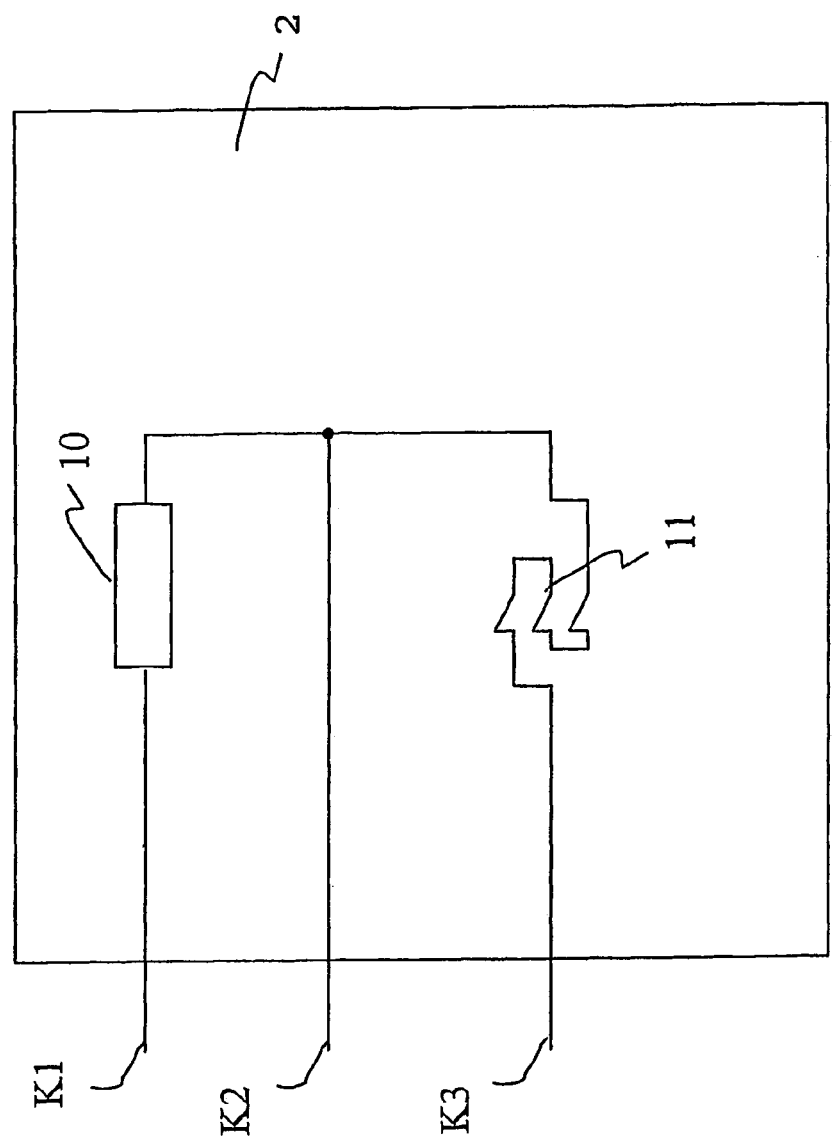
FIG. 1 shows a schematic illustration of an embodiment of an electric motor according to the present invention with a temperature monitoring device.

FIG. 1 shows, in a basic diagram, an electric motor 2 with a device 1 for monitoring temperature. Device 1 for monitoring temperature includes a first temperature sensor 10 and a second temperature sensor 11. Temperature sensors 10, 11 can be designed as silicon sensors (KTY sensors) with a positive temperature coefficient. Furthermore, the temperature sensors can be designed as single-fold bimetallic element switches and/or as three-fold bimetallic element switches that enable temperature tripping. Temperature sensors 10, 11 are connected by electrical wires to a first, second and third terminal clamp K1, K2, K3 on electric motor 2.

Any type of thermal resistors having switching or non-switching characteristics can be used as temperature sensor 10, 11. They include, for example, "service-mounted network resistors" (SMN resistor) as specially designed thermal resistors with a positive temperature coefficient and switching characteristics. With the aid of SMN resistors of this type it is possible to monitor three phase windings of the electric motor for thermal tripping. The characteristic curve of the SMN resistor has a defined switching-off point that is transmitted to a regulating device connected to the electric motor, the regulating device having temperature sensor inputs with SMN-resistor characteristics.

Figure 2:
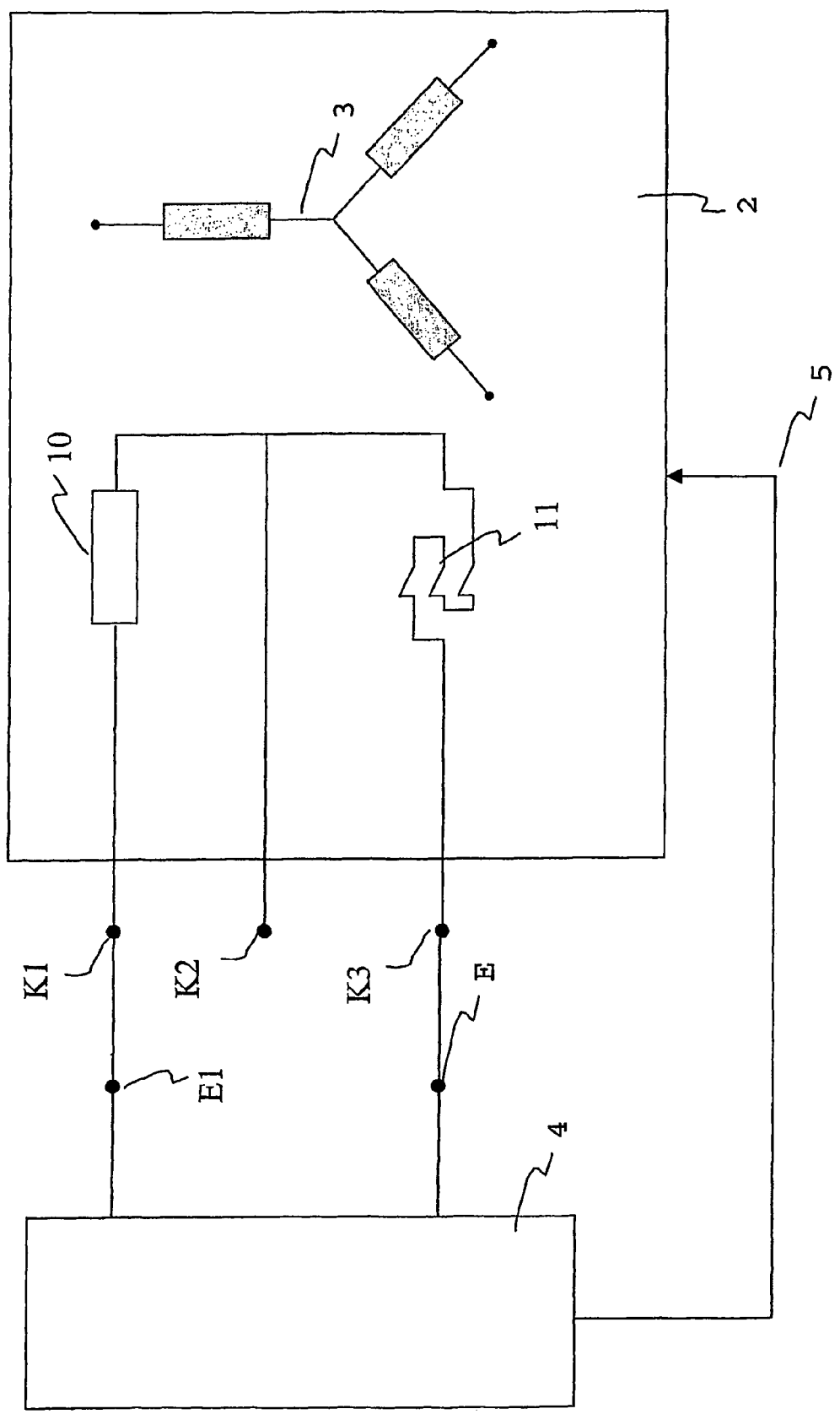
FIG. 2 shows a basic illustration of an electric motor according to the present invention with a temperature monitoring device and with a regulating device for controlling the electric motor.

An exemplary embodiment of an interconnection of a regulating device 4 with electric motor 2 according to the present invention is shown in FIG. 2. Regulating device 4 includes a first temperature sensor input E1 and a second temperature input E2 that are capable of being connected with terminal clamps K1 through K3 of the electric motor in a specific manner. Regulating device 4 controls electric motor 2 via a control line 5 with the temperature sensor values transferred from electric motor 2.

As shown in FIG. 2, the user of regulating device 4 with a specific temperature sensor input characteristic is able to correctly match regulating device 4 by suitably interconnecting the first and second temperature sensor inputs E1, E2 and the terminal clamps of electric motor 2. As a result, electric motor 2 now only needs to be equipped with one standard type of temperature monitoring sensor system to be operated with regulating devices having highly diverse temperature sensor input characteristics.

In the exemplary embodiment in FIG. 2, first temperature sensor 10 can be a KTY sensor, for example, and second temperature sensor 11 can be a three-fold bimetallic element switch. Temperature sensors 10, 11 are located in the direct vicinity of a motor winding 3 of electric motor 2. With the aid of the connection of first temperature sensor input E1 of regulating device 4 with first terminal clamp K1, and the connection of second temperature sensor input E2 of regulating device 4 with third terminal clamp K3 as shown, it is possible to use a regulating device 4 having the temperature sensor input characteristics of a KTY sensor and a three-fold bimetallic element switch.

Furthermore, when temperature sensor inputs E1, E2 of regulating device 4 are connected with first and second terminal clamps K1, K2 of electric motor 2 it is also possible to connect a regulating device 4 having only the sensor characteristics of a KTY sensor.

Furthermore, by connecting temperature sensor inputs E1, E2 of regulating device 4 with second and third terminal clamps K2, K3 of electric motor 2, it is also possible to connect a regulating device 4 having only the sensor characteristics of a three-fold bimetallic element switch.

The manufacturer of the electric motor according to the present invention therefore obtains the advantage that a wide variety of temperature sensor systems to be installed in the motor can be reduced. This advantageously results in reduced inventory of temperature sensors and electric motors and the resultant lower costs. In addition, due to the fact that only one single temperature monitoring sensor system need be provided for each motor, production costs for the electric motor can be advantageously reduced.

Since the temperature monitoring sensor systems of the electric motor must be installed in the electric motor at a very early stage of the production process, it is normally extremely complicated to carry out subsequent adjustment work to a specific regulating device in the electric motor. This adjustment work can be avoided in a particularly advantageous manner with the present invention.

The user of the electric motor according to the present invention advantageously obtains independence in terms of selecting which regulating device to connect to the electric motor.

The uniform configuration of electric motors in terms of temperature monitoring sensor systems further results in the advantage that the likelihood of error during motor assembly can be reduced.

| Reference Numerals |  |
|---|---|
| 1 | Temperature monitoring device |
| 2 | Electric motor |
| 3 | Motor winding |
| 4 | Regulating device |
| 5 | Control line |
| 10 | First temperature sensor |
| 11 | Second temperature sensor |
| E1 | First temperature sensor input |
| E2 | Second temperature sensor input |
| K1 | First terminal clamp |
| K2 | Second terminal clamp |
| K3 | Third terminal clamp |

What is claimed is:

1. An electric motor comprising a temperature monitoring device, whereby the device (1) includes at least two temperature sensors (10, 11) with different temperature characteristics, and the temperature sensors (10, 11) are connected to terminal clamps (K1, K2, K3) by means of electrical wires, wherein the electric motor (2) includes a first terminal clamp (K1), a second terminal clamp (K2) and a third terminal clamp (K3), whereby a first temperature sensor (10) is connected between the first terminal clamp (K1) and the second terminal clamp (K2), and whereby a second temperature sensor (11) is connected between the second terminal clamp (K2) and the third terminal clamp (K3).

2. The electric motor as recited in claim 1, wherein the temperature sensors (10, 11) have a positive temperature coefficient and are designed as silicon sensors and/or three-fold bimetallic element switches and/or single-fold bimetallic element switches and/or as SMN resistors, whereby the temperature sensors (10, 11) have switching and/or non-switching characteristics.

* * * * *